(12) United States Patent
Mayer et al.

(10) Patent No.: US 6,651,998 B1
(45) Date of Patent: Nov. 25, 2003

(54) SAFETY COVERING FOR AN AIRBAG

(75) Inventors: Wolfgang Mayer, Wörth (DE); Jürgen Skowronnek, Waldbröl (DE); Thomas Jahn, Forst (DE)

(73) Assignee: SAI Automotive SAL GmbH, Worth am Rhein (DE)

( * ) Notice: Subject to any disclaimer, the term of this patent is extended or adjusted under 35 U.S.C. 154(b) by 0 days.

(21) Appl. No.: 10/018,722
(22) PCT Filed: Jun. 16, 2000
(86) PCT No.: PCT/EP00/05606
§ 371 (c)(1),
(2), (4) Date: Apr. 30, 2002
(87) PCT Pub. No.: WO00/78579
PCT Pub. Date: Dec. 28, 2000

(30) Foreign Application Priority Data

Jun. 18, 1999 (DE) .................................. 299 11 205 U

(51) Int. Cl.[7] .............................................. B60R 21/20
(52) U.S. Cl. ..................................... 280/728.3; 280/732
(58) Field of Search ............................. 280/728.3, 732, 280/730.1, 728.2

(56) References Cited

U.S. PATENT DOCUMENTS 5,899,488 A    5/1999   Muller

FOREIGN PATENT DOCUMENTS

| DE | 4442543 A1 | 1/1996 | |
| DE | 19726878 | 10/1998 | |
| DE | 19750182 A1 * | 5/1999 | ........... B60R/21/20 |
| DE | 29912825 U1 | 12/1999 | |
| EP | 0765781 A1 | 4/1997 | |
| EP | 0867346 A1 | 9/1998 | |
| EP | 1004481 A2 | 5/2000 | |
| JP | 07291082 A * | 11/1995 | ........... B60R/21/22 |

* cited by examiner

Primary Examiner—Peter C. English
(74) Attorney, Agent, or Firm—Brinks Hofer Gilson & Lione

(57) ABSTRACT

The invention relates to a hidden safety covering for an airbag arranged behind a inner lining part (1) which consists of at least one supporting part (5), of a foam layer (4) and of a decorative layer (3). In an area which is delimited by a weakening (5') of the cross-section and/or by a material separation (5") in the supporting part, the material of the supporting part and at least portions of the foam layer can be removed before the airbag (2') unfolds from the effective area thereof (7'), and can be brought behind the inner lining part, for example, into a capture chamber (8). To this end, the removable portion of material is preferably connected to a traction strip (10) which can be actuated by a traction device that can be initiated by a sensor.

13 Claims, 2 Drawing Sheets

SAFETY COVERING FOR AN AIRBAG

Figure 2:
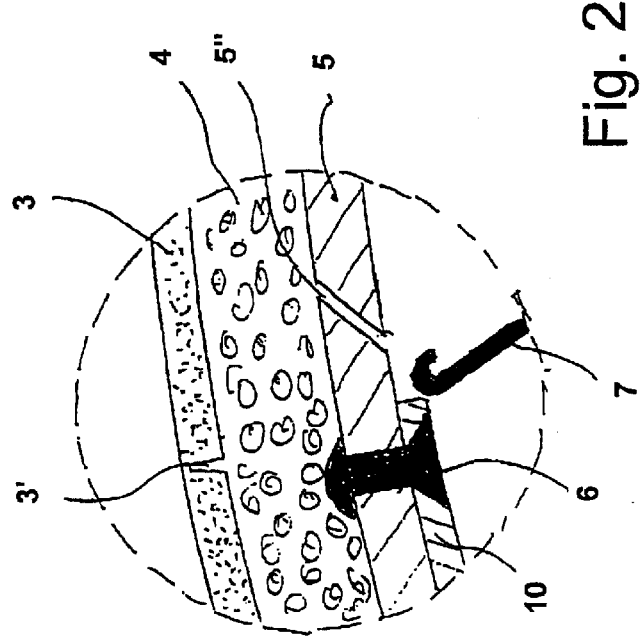

The invention relates to a safety covering for an airbag.

Airbag coverings on interior trim panels of motor vehicles in which the lining comprises a dimensionally stable supporting part and a decorative layer, which are interconnected by a foam layer, are frequently designed in prior art as "invisible" coverings. Here through a rear-side cross-sectional weakening of the supporting part and generally also of the decorative layer, a single- or double-bladed "flap" is produced which is burst open by the opening (inflated) gas bag of the airbag system. Of the many publications which go deeper into this prior art, let DE 196 46 548 be mentioned, from which a comprehensive overview of this prior art can be taken. In this process, the burst- open flaps point towards the interior of the vehicle; they therefore contain an injury risk in the case of impact with a person. In DE 196 46 548, it is proposed, in order to reduce the risk of injury, that the aperture through which the gas bag passes should be designed not in the shape of a flap, but in a "pointed oval" shape, similar to a fish's mouth. Since however the tearing edges of the supporting part also arch towards the passenger compartment, the injury risk in relation to the flap disintegration is admittedly reduced, but not completely eliminated.

Another attempt at solving the problem is quoted in EP 867 346 A1. A component set in motion, which is a constituent part of the airbag device and is brought into motion before the expansion of the gas bag, actuates the airbag covering in such a way that the flaps of the covering move substantially within the outer contour of the airbag device. The examples listed in this publication show an actuating mechanism which has positive guiding of the flaps with the aid of traction cams and link guides. Such a solution renders considerably more difficult the one-piece production of a trim panel through the previously standard foaming together of the supporting part and the decorative layer, since it is not possible to foam in the traction cams and the link guides. The attachment of covering devices and the airbag device also requires difficult assembly work since the propulsion channel of the gas bag and the covering predetermine an enclosed space which is difficult to access from outside. Finally forces of inertia affect the traction and guide cams of the covering in addition, since the opening movement has to take place before the inflation of the airbag device, and this in a matter of milliseconds. The solution proposed by EP 0 867 346 A1 also requires special airbag devices having an integrated drive device; the previously used devices cannot be employed.

The object of the present invention is to provide an "invisible" airbag covering in interior trim panels of vehicles, which renders possible simple and reliable production by foaming together the supporting part and decorative layer, which ensures that no material portions of the supporting part reach the passenger compartment and represent an injury risk there, which makes it possible to use airbag devices of conventional design, and which also continues to function reliably at high component accelerations and the acceleration forces resulting therefrom.

This object is accomplished by providing the safety covering with a capture chamber for the tear-off region of the supporting part, and for the separated material of the foam layer, which capture chamber has a guide edge configured as a roller for a traction strip. Because, in the region of the safety covering delimited by cross-sectional weakening and/or material separation in the supporting part, the material of the supporting part and at least parts of the foam layer can, before the gas bag unfolds, be removed from its effective area and be brought behind the interior trim panel. On the one hand the occupants are reliably protected against damaging edges, and secondly the "Propulsion channel" of the gas bag can be kept free of components such as guide lugs, clams or flap edges, components which harm the inflating gas bag or at least impair its functioning.

When the material portions of the supporting layer and at least parts of the foam layer have been removed from the effective area of the gas bag, the decorative area still covers the gas bag aperture. Under the term "decorative layer" are to be understood all the materials which are standard in prior art, such as pre-moulded thermosetting foils and sintered slush skins. These decorative foils can be easily penetrated by the gas bag, particularly if they have cross-sectional weakenings in the penetration region. Such cross-sectional weakenings can be mechanically produced scorings of the rear side of the decorative layer, but to an increasing extent are also micro-perforations which are introduced with the aid of laser beams. Since the cross-sectional weakening can be of any predetermined type, the tearing characteristics of the decorative layer can be influenced and thus also the unfolding characteristics of the gas bag. The decorative layer has firstly a lower mass, secondly it consists of a soft, yielding material, such that under standard operating conditions it represents no danger of injury for the occupants and no risk of damage to the gas bag.

Removing the supporting part material from the effective area of the unfolding gas bag can advantageously come about in that this region of the supporting part is securely connected, approximately over its entire width, on the rear side to a correspondingly wide traction strip, which engages parallel to a cross-sectional weakness predetermining the tear-off region, and specifically with a tractive force directed approximately perpendicular to the supporting part, which force is applied by a traction device which can be released by a driving situation sensor. The flat attachment of the tear-off region has the advantage of optimum introduction of force with simultaneous minimisation of the masses to be moved, by which means the ability of the arrangement to function remains guaranteed even in the case of high accelerations. The traction strip can be guided in a simple manner in such a way that it engages approximately perpendicular to the supporting part surface (in the direction of the surface normal), by which means reliable tearing along the cross-sectional weakening can be achieved, at least the traction strip can introduce much higher forces than for example cam followers maintain in a link guide. The traction strip is preferably glued flat and connected to the corresponding region of the supporting part. In the area of introduction of force, the peeling tensions occurring during adhesion can be absorbed by additional measures, for example by a row of rivets.

If no additional constructional measures are provided, the separation of the supporting part tear-off portion from the decorative layer takes place in the foam layer which has the lowest material strength in the system composed of supporting part/foam/decorative layer. A portion of the foam will, since the tearing of the foam layer takes place in an uncontrolled manner, remain on the decorative layer and can reach the passenger compartment with the gas bag. This can be counteracted by the decorative layer being provided on the side remote from the visible side in the airbag region at least partially with an adhesion-lessening coating, which makes it easier to detach the foam layer from the decorative layer. A further possibility consists in extending the traction strip into the foam layer; a design which causes for example no constructional difficulties if a material separation delimits one side of the tear-off region. The region of the traction strip extending into the foam here expediently runs. closely below the decorative layer. Two modes of operation are possible:

1. The traction strip area in the foam defines a tear zone in the foam (weak point function).
2. The traction strip region in the foam is securely connected to the rear side of the decorative layer (function as a tearing aid for the decorative layer).

In the second case, the decorative layer preferably also has a peripheral cross-sectional weakening which corresponds in its course to the cross-sectional weakening in the supporting part and is brought together with the supporting part tear-off portion (and the foam layer) behind the interior trim panel. Here, too, the traction strip can transfer great forces to the decorative layer and thus reliably cause it to tear open.

The traction device can act in a linear manner, it can however also be a winding device, acting similarly to a belt tightener. The application of a traction strip here permits deflections of the traction device, such that optimal use of the space in the installation site is possible. A pyrotechnic drive is preferred or at least pyrotechnic release of some other operating mechanism (acting electrically, pneumatically mechanically, such as for example a pneumatically driven step piston) will have been used, because in this case the driving operation sensor of the airbag can also be used to release the traction strip drive. In the case of a pyrotechnic drive of the traction strip, the pyrotechnic pressure generator of the airbag device can be also used to expose the propulsion channel. The delayed release of the airbag can here be simply realised by electronic signal delay in a manner known per se. In the case of this solution, however, a specially designed pyrotechnic pressure generator is necessary. If an airbag module is to be applied in a standard constructional manner, it is expedient for the traction device and the airbag module to have separate drives. In the case of this solution, too, the use of pyrotechnic drives is advantageous. A further advantage in separate airbag assemblies, in conjunction with the flexibility of the traction strips, is that the utilisation of space in the airbag region can be optimised, which simultaneously improves the ease of assembly. For the utilisation of space and ease of assembly it can also be expedient if the safety covering has at least one capture chamber for the tear-off region of the supporting part and for the separated material of the foam layer, in order to prevent material portions of the safety covering from nevertheless reaching the passenger compartment in an uncontrolled manner.

In addition, the capture chamber can have a guide edge, configured as a roller, for the traction strip, a measure which brings additional gain in functional reliability. It can serve the same purpose if the tear-off region of the supporting part has a plurality of cross-sectional weakenings arranged parallel to the tearing edge. In this manner the intrinsically rigid tear-off region of the supporting part can be provided with a flexibility orientated in the drawing-in direction towards the capture chamber.

The decorative layers are generally soft and have low masses, thus they do not represent any risk to the occupants.

In the case of safety devices, however, extraordinary operating conditions must also be taken into account, for the decorative layer for example its behaviour at unusually low temperatures. Here, depending on the material of the decorative layer, material embrittlement can occur, with the result that the gas bag as it punctures the decorative layer could cause it to break into fragments. Brittle fragments in the passenger compartment must, however, be able to be reliably excluded even in the case of an unlikely but possible operating state. In a simple manner, possible low-temperature embrittlement can be compensated for if the decorative layer in the effective area of the gas bag is connected on its rear side to a net-like fabric formed from materials which do not become brittle at low temperatures, for example from natural fibres, but this fabric does not also cover the cross-sectional weakening of the decorative foil. Because fragmentation of the decorative layer admittedly cannot be avoided at extremely low temperatures, but the fragments are securely anchored to a net which will not become brittle, fragments flying freely in the passenger compartment are excluded. Since in this solution the cross-sectional weakening of the decorative foil is not impaired in its function in the penetration area of the airbag, (because it is not covered), tearing of the decorative layer in the geometry provided is guaranteed. However the decorative foil can also be connected, at least in the effective area of the gas bag, on the rear side with a flat heating device and any material embrittlement occurring as a result of low temperatures can be "heated away". The foam layer thus prevents the flow of heat towards the supporting part so that the heat requirement of such a solution is only low. Such regional heating of the decorative layer can naturally also be used at "normal" temperatures in order partially to reduce the rigidity of the decorative layer. Since area heating of this type not only heats the decorative foil but also a thin layer of the adjoining foam, with a maximum temperature at the boundary surface, the foam is thermally weakened at the boundary surface, by which means defined separation of decorative layer and foam in the boundary layer is caused when the need for the safety covering arises. The technical realisation of the decorative layer heating does not present any problems; prior art offers a plurality of solutions, for example heating foils or heat conductor imprints'which can be applied to the rear side of the decorative layer.

A safety covering according to the invention can also be subdivided into a plurality of separating regions for the material of the supporting part and for the material of the foam layer, which can each be brought, on their own, behind the interior trim panel, with the advantage that the masses to be moved are reduced and that problematic space conditions can be better taken into account. In all variants in the development of the inventive idea, the additional outlay by comparison with prior art is low (apart, naturally for an additionally required traction device or specially adapted airbag device), but above all, all the additional elements can be applied in the region of the supporting part, foam layer and decorative layer before these parts are foamed together, with good accessibility, and do not prevent the foaming together, such that a proved production technique can be retained.

Figure 1:
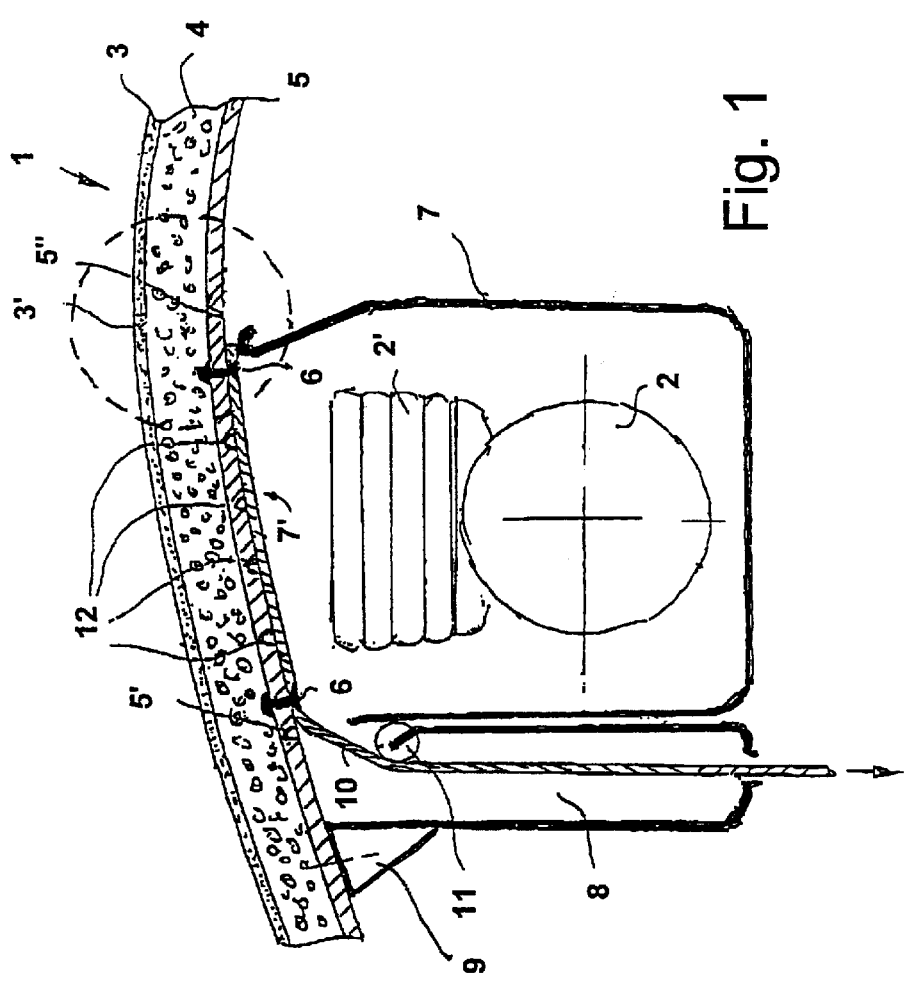
Figure 4:
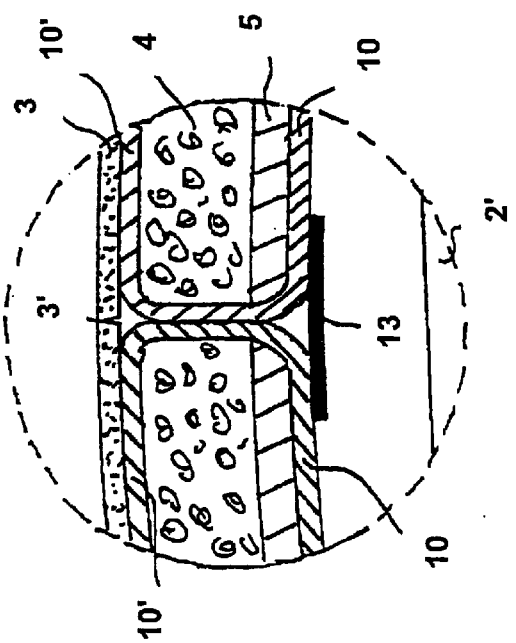
Figure 3:
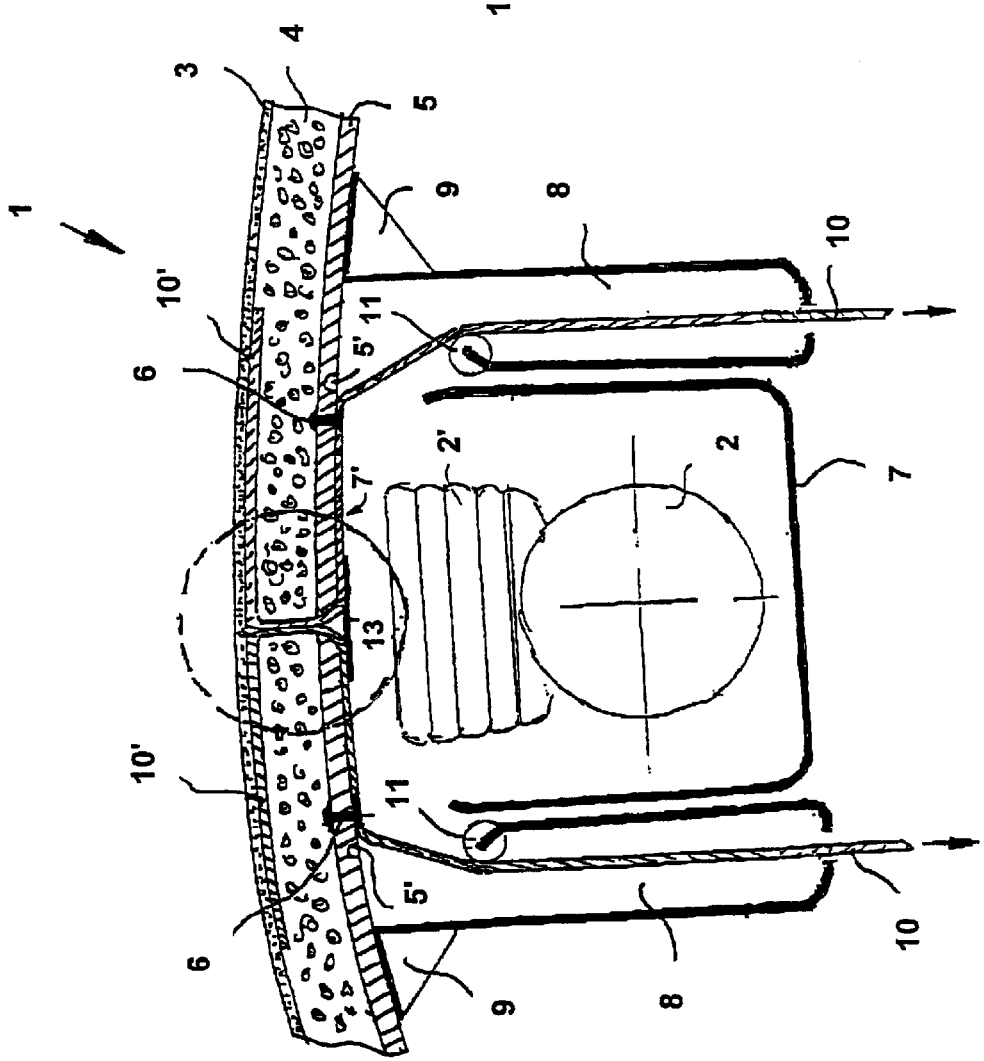

The invention will now be described in greater detail with the aid of FIGS. 1 to 4. The figures show:

FIG. 1 in a schematic sectional view, a safety covering with a capture chamber for the torn-off material, FIG. 2 an enlarged detail from FIG. 1 to explain the material weakening, FIG. 3 a two-part safety covering with a traction strip guided into the foam layer, in the same type of representation as FIG. 1, and finally FIG. 4 an enlarged detail from FIG. 3 to explain the connection area between the tear-off zones.

In FIG. 1, 1 refers to the trim panel which is composed of the supporting part 5, the foam layer 4 and the decorative layer 3. These elements are foamed together in the method belonging to prior art. The schematically represented airbag device comprises the gas generator 2 and the gas bag 2'. It is disposed in the housing 7, the upper opening region 7' of which corresponds approximately to the effective area of the expanding gas bag 2'. The supporting part 5 has the cross-sectional weakening 5' which delimits one side of the covering area. The other side of this area is pre-determined by the material separation 5" in the supporting part 5. This material separation 5" can, if for example it is produced by means of laser beams, run at an angle in the manner represented and thus support the covering area against inward pressure from outside. A traction strip 10 is glued over its whole area to the supporting part and protected against peeling tensions by means of safety rivets 6.

Between the predetermined fracture point 5' and the material separation 5" run material weakenings 12, specifically parallel to the predetermined fracture point 5', in order to make the tear-off region of the supporting part 5 more flexible for better entry into the capture chamber 8. The capture chamber 8 is secured, separately from the housing 7 of the airbag device and with the aid of angle bracket 9 on the rear side of the support part 5. The drawing-in edge of the capture chamber 8 is configured as a guide roller 11, with the aid of which the traction strip 10 is guided and so deflected that the traction forces engage approximately perpendicular to the tearing surface. The traction device is here not shown in the figures as its design has no influence on the functioning of the safety covering. The arrows reproduce the direction of traction in the figures. If the traction strip 10 is drawn in the direction of the arrow, first of all the predetermined fracture point 5' tears and the supporting part region between 5' and the material separation 5" is drawn towards the capture chamber 8. Here foam regions 4 continue to adhere to the torn-off portion of the supporting part 5 (the material separation takes place in the "weakest" material) and are also drawn with the torn-off portion of the supporting part into the capture chamber 8. Entering chamber 8 via rolling edge 11 is made easier by weak points 12 which make the torn-off portion of the supporting part 5 more flexible in the drawing-in direction. The decorative layer 3 still covers the effective area 7'. The decorative layer 3 has a pre-weakening 3' (produced by cutting or by means of laser beams in a known manner) at which the decorative layer tears on the subsequent expansion of the gas bag 2' and is punctured. In FIG. 2, material separation 5" and the pre-weakening 3' of the decorative layer 3 are represented enlarged with the same designation of the parts as in FIG. 1.

The traction strip 10 can consist of any material; it only has to meet three conditions: it must be flexible (slack), it must be able to transfer tractive forces adequately and it may not become brittle or soften in dependence on temperature. For example the traction strip can consist of a material such as is used for safety belts.

FIG. 3 illustrates an embodiment in which the tear-off portion of the supporting part 5 is subdivided into two tear-off portions, the subdivided traction strip 10 extending with its regions 10' into the respective foam layer. The easily torn sealing 13 here merely has the function of preventing the undesired excape of foam as the trim panel is foamed. Parts with the same function are designated with the same reference numerals as in FIG. 1.

In the application of FIG. 3, a traction strip can be expedient which can be foamed through something, for example through a grid or mesh structure. In this manner, the connecting point of the two tear-off regions can be well supported. Traction strip regions 10' can be securely connected to the decorative layer 3 (welding, gluing) the pre-weakening 3' being disposed in the connection area, as FIG. 4 shows in enlargement. With the same basic function as the assembly according to FIG. 1 (the tearing occurs first of all at the predetermined fracture points 5') the decorative layer is then also acted upon by the traction strip 10 for example by its regions 10' and tears at the pre-weakening 3', i.e. is not punctured by the gas bag 2'. The tear-off regions of the safety covering are drawn without residue into the capture chambers 8 before the gas bag expands.

The decorative layer 3 can, on the side remote from the visible side, be provided in the region between the predetermined fracture point 5' and the material separation 5" at least partially with an adhesion-lessening coating, such that the release of the foam layer 4 (FIG. 1) or respectively of traction strip region 10' from the decorative layer 3 is rendered easier. The examples of the figures are illustrative of the invention; other embodiments of the inventive idea are possible and can also be advantageous, depending on the trim panel.

What is claimed is:

1. An invisible safety covering for an airbag that is arranged behind an interior trim panel, the interior trim panel including a supporting part, a foam layer and a decorative layer, wherein the safety covering is delimited by at least a cross-sectional weakening in the supporting part, and comprises a traction device for removing a tear-off region of the supporting part and at least portions of the foam layer, before the airbag unfolds, from in front of the airbag to behind the interior trim panel, a capture chamber for the tear-off region of the supporting part and separated portions of the foam layer, and a roller located on an upper edge of the capture chamber adjacent to the tear-off region providing a guide edge for the traction device.

2. The safety covering according to claim 1, wherein the decorative layer covering the tear-off region of the supporting part has cross-sectional weakenings that are punctured by the unfolding airbag after the material of the supporting part and foam layer has been removed.

3. The safety covering according to claim 1 or 2, wherein the traction device includes a traction strip securely connected to the tear-off region of the supporting part, which can be removed from in front of the unfolding airbag, the traction strip extending approximately over the entire width of the tear-off region, the traction strip extending approximately perpendicular to the supporting part and parallel to the cross-sectional weakening in the supporting part.

4. The safety covering according to claim 3, wherein the traction strip extends into the foam layer.

5. The safety covering according to claim 4, wherein the traction device is one which acts in a linear manner.

6. The safety covering according to claim 3, wherein the traction device is one which acts in a linear manner.

7. The safety covering according to claim 3 wherein the tear-off region of the supporting part has a plurality of cross-sectional weakenings.

8. The safety covering according to claim 3 wherein the covering comprises a plurality of tear-off regions in the supporting part and in the material of the foam layer, and a plurality of traction devices coupled to the tear-off regions behind the interior trim panel.

9. An invisible safety covering for an airbag that is arranged behind an interior trim panel, the interior trim panel including a supporting part, a foam layer and a decorative layer, wherein the safety covering is delimited by at least a cross-sectional weakening in the supporting part, and comprises a traction device extending into the foam layer for removing a tear-off region of the supporting part and at least portions of the foam layer, before the airbag unfolds, from in front of the airbag to behind the interior trim panel, a capture chamber for the tear-off region of the supporting part and separated portions of the foam layer, and a roller located on an edge of the capture chamber adjacent the tear-off region providing a guide for the traction device.

10. The safety covering according to claim 1, 2 or 9 wherein the covering comprises a plurality of tear-off regions in the supporting part and in the material of the foam layer, and the traction device comprises a plurality of traction devices coupled to the tear-off regions behind the interior trim panel.

11. The safety covering according to claim 9 wherein the tear-off region of the supporting part has a plurality of cross-sectional weakenings.

12. The safety covering according to claim 11 wherein the traction device includes a traction strip securely connected to the tear-off region of the supporting part, which can be removed from in front of the unfolding airbag, the traction strip extending approximately over the entire width of the tear-off region, the traction strip extending approximately perpendicular to the supporting part and parallel to the cross-sectional weakenings.

13. An invisible safety covering for an airbag that is arranged behind an interior trim panel, the interior trim panel including a supporting part, a foam layer and a decorative layer, wherein the safety covering is delimited by at least a cross-sectional weakening in the supporting part, and comprises a traction device extending into the foam layer for removing a tear-off region of the supporting part and at least portions of the foam layer, before the airbag unfolds, from in front of the airbag to behind the interior trim panel, a capture chamber for the tear-off region of the supporting part and separated portions of the foam layer, and a roller located on an edge of the capture chamber adjacent the tear-off region providing a guide edge for the traction device, the decorative layer covering the tear-off region of the supporting part having cross-sectional weakenings that are punctured by the unfolding airbag after the material of the supporting part and foam layer has been removed.

* * * * *